No. 653,813. Patented July 17, 1900.
H. MARLES.
CARVING MACHINE.
(Application filed Jan. 10, 1900.)
(No Model.) 5 Sheets—Sheet 2.

Witnesses.
Inventor.
Henry Marles.
By James L. Norris
Att'y.

No. 653,813. Patented July 17, 1900.
H. MARLES.
CARVING MACHINE.
(Application filed Jan. 10, 1900.)
(No Model.) 5 Sheets—Sheet 3.
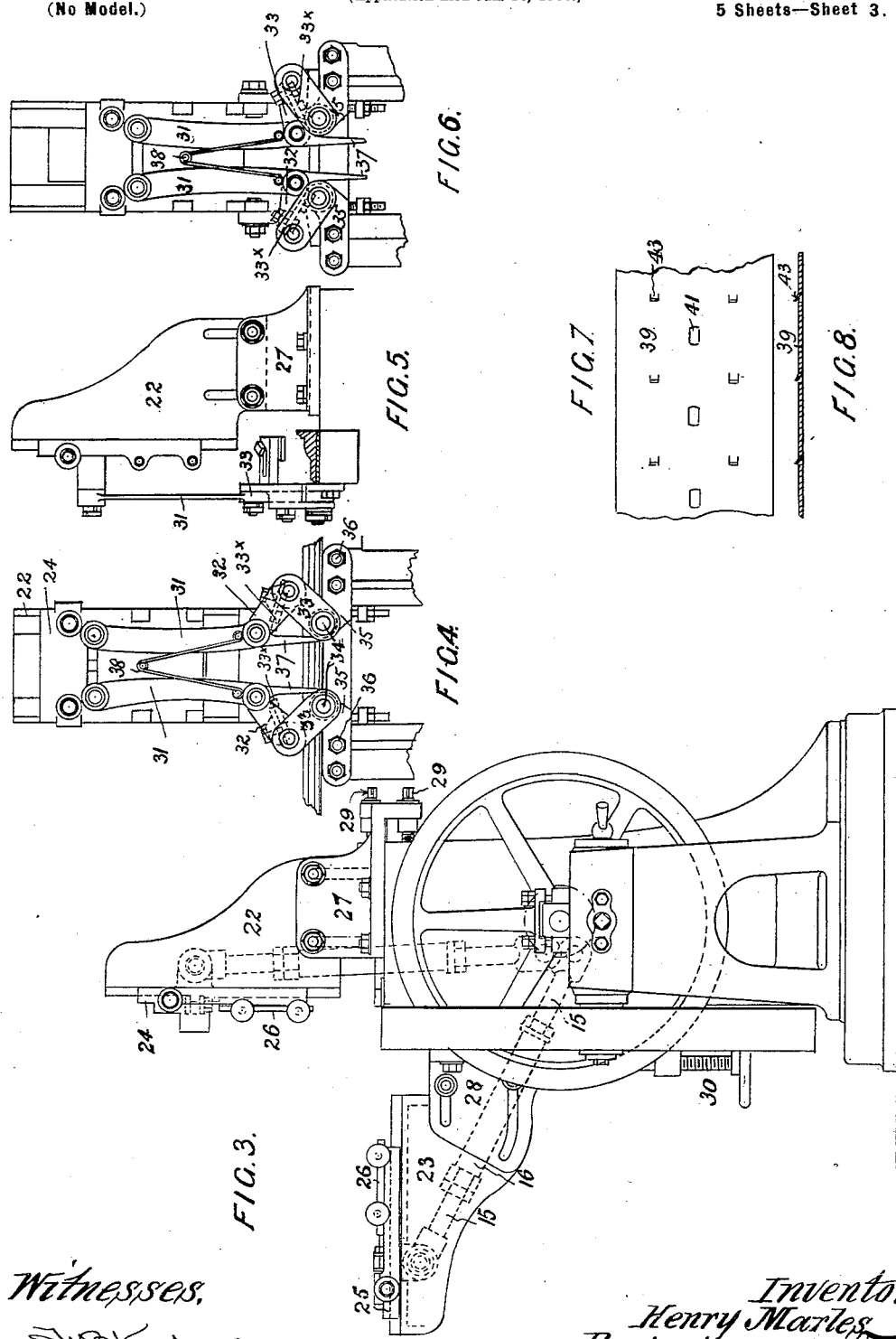

No. 653,813. Patented July 17, 1900.
H. MARLES.
CARVING MACHINE.
(Application filed Jan. 10, 1900.)
(No Model.) 5 Sheets—Sheet 4.
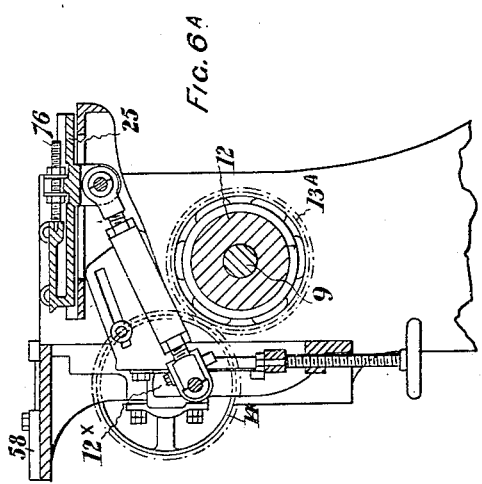
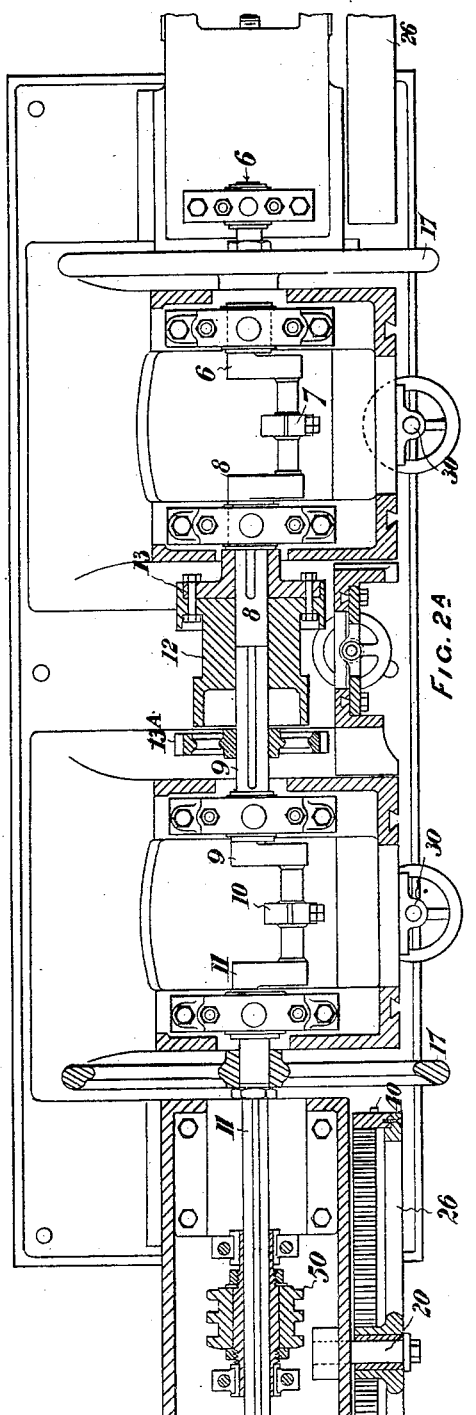
Witnesses:
W. Lee Helm
C. D. Kesler
Inventor:
Henry Marles
By James L. Norris No. 653,813. Patented July 17, 1900.
H. MARLES.
CARVING MACHINE.
(Application filed Jan. 10, 1900.)
(No Model.) 5 Sheets—Sheet 5.
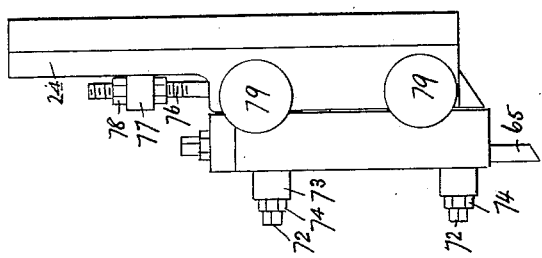
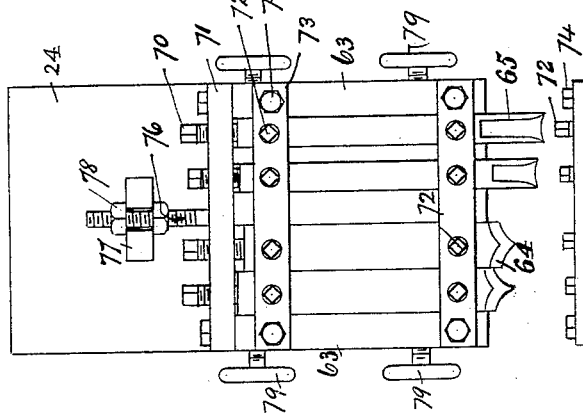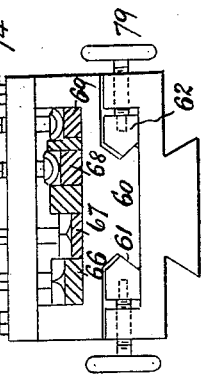
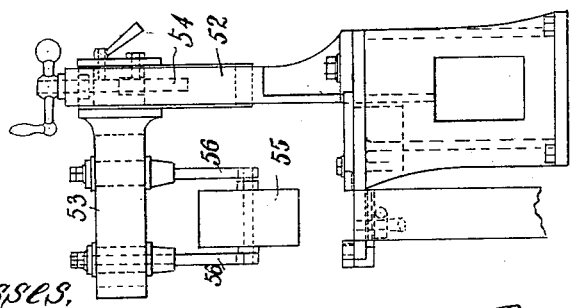
Witnesses,
Inventor.
Henry Marles,
By James L. Norris,
Atty.

UNITED STATES PATENT OFFICE.

HENRY MARLES, OF LONDON, ENGLAND, ASSIGNOR TO THE MARLES CARVED MOULDING COMPANY, OF PHILADELPHIA, PENNSYLVANIA.

CARVING-MACHINE.

SPECIFICATION forming part of Letters Patent No. 653,813, dated July 17, 1900.

Application filed January 10, 1900. Serial No. 1,007. (No model.)

*To all whom it may concern:*

Be it known that I, HENRY MARLES, a subject of the Queen of Great Britain and Ireland, residing at Glengall Road, Millwall, London, England, have invented new and useful Improvements in Carving-Machines, of which the following is a specification.

This invention refers to the machine described in the specification of my Patent No. 616,002, dated December 13, 1898, by which machine repeat ornaments or patterns are carved on wood moldings and the like very quickly, and so that no touching up by hand or even sandpapering is needed. Experience in the use of this machine has shown that the carving of more elaborate and varied patterns necessitates the application of an additional number of reciprocating slides, some of them having tools with a new movement; but this requires such an extension in the length of the machine-bed that a new and more accurate feed movement is required because of the greater range of patterns being carved on at the same time, and consequently a greater number of steps in the feed between the first and the last tools operating upon the molding.

Figure 1:
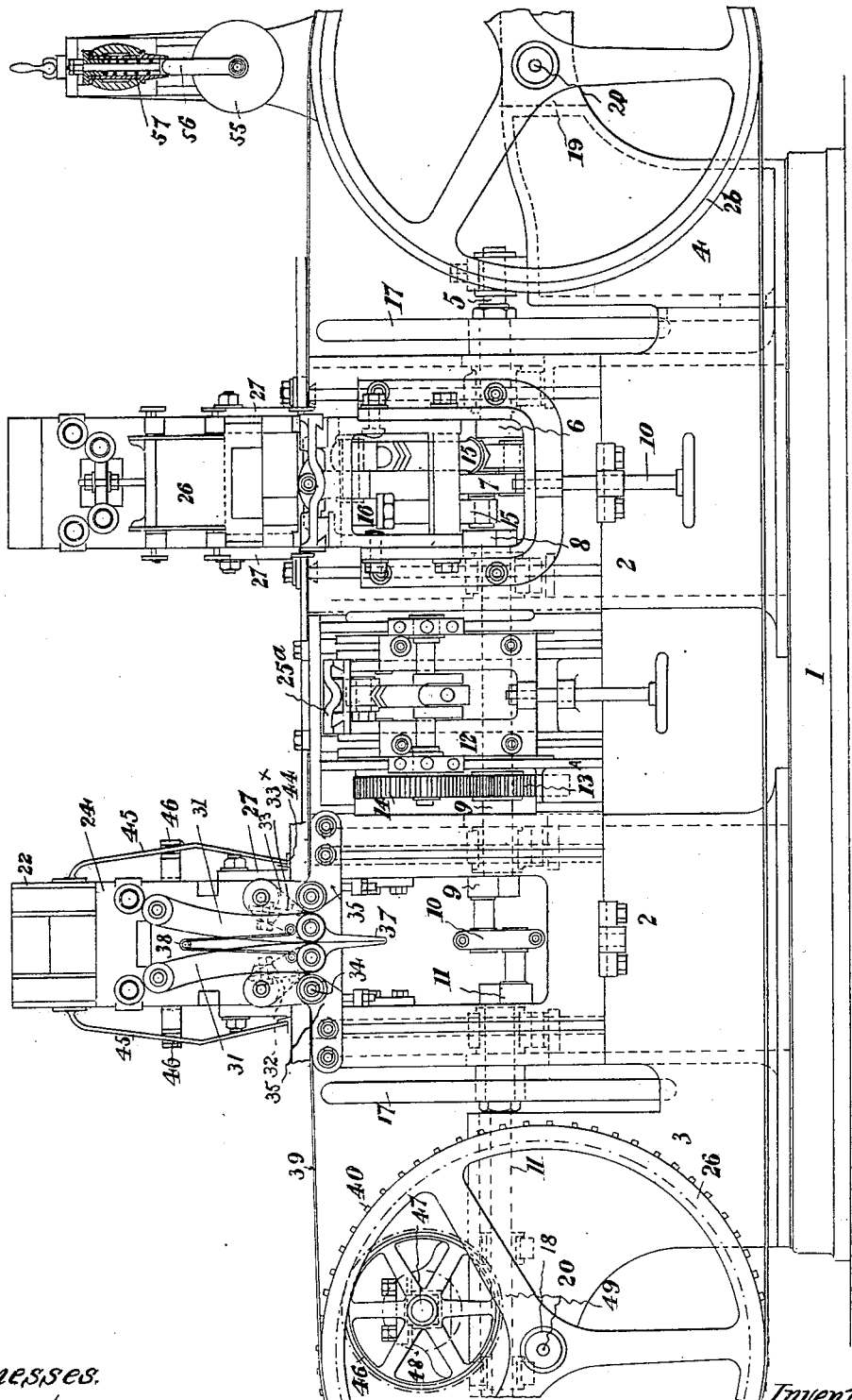
Figure 2:
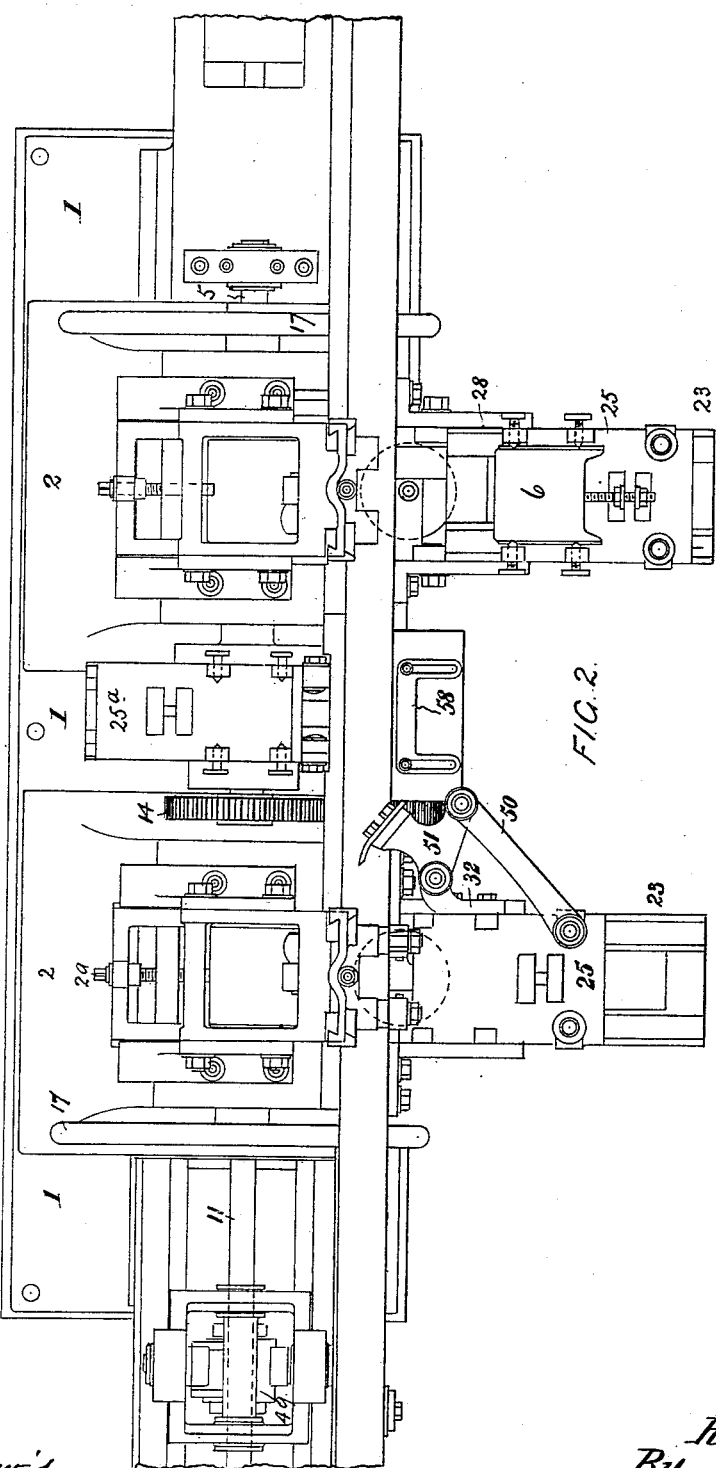

Figure 1 is a front elevation of the machine; Fig. 2, a plan of same. Fig. 2ª is a sectional plan on the line of the shafting; Fig. 3, an end elevation showing one set of tool-slides; Fig. 4, a front view of one of the other tool-slides with the parts in a different position to that shown in Fig. 1; Fig. 5, an end view of Fig. 4; Fig. 6, a front view of the tool-slide of Fig. 4 shown in yet another position. Fig. 6ª is a transverse part-sectional detail view; Fig. 7, a plan view, and Fig. 8 a longitudinal section of part of the feed-belt. Fig. 9 is an end view of a presser-roller device, and Figs. 10, 11, and 12 detail views of a tool-chuck.

Upon a bed-plate 1 are fixed frames 2, 2, 3, and 4. Carried on the frames is a driving-shaft made in parts, so as to form four cranks. It therefore consists of a shaft 5, which terminates in a crank 6, a link 7, with a radially-struck slot, a crank-shaft 8, united to the latter by a bolt, whereby the two cranks 6 and 8 can be relatively adjusted, a crank-shaft 9, a link 10, with a radially-struck slot, and a crank-shaft 11, united to the latter by a bolt, whereby the two cranks 9 and 11 can be relatively adjusted. Furthermore, the shafts 8 and 9 are united by a clutch, which also by preference forms a stepped pulley that by a belt from a corresponding stepped pulley on some suitable rotating shaft drives the machine at one of three speeds. The clutch consists of a three-stepped pulley 12, Fig. 2ª, which is fixed on the shaft 8, and by two bolts passing through its end flange is united to a disk 13, that is fixed on the end of the crank-shaft 9. The bolt-holes in the disk 13 are twelve in number and the holes in the flange of the three-stepped pulley 12 are ten in number, so that these two parts forming a clutch can be relatively adjusted by shifting them around and inserting the bolts in new holes. It will thus be understood that the crank 6 can, by the slotted link 7, be adjusted angularly relatively to the crank 8, that the crank 8 can, by the clutch, be adjusted angularly relatively to the crank 9, and that the crank 9 can, by the slotted link 10, be adjusted angularly relatively to the crank 11. Besides this driving-shaft consisting of the crank-shafts 6, 8, 9, and 11 there is a crank-shaft 12, which by tooth-wheels 13 and 14 is driven from the aforesaid driving-shaft. Bearings are provided on the framing for the shafts, as shown.

Motion is transmitted from the cranks by connecting-rods 15, which by means of screwed sleeves 16 and right and left hand screw-threads are made adjustable in length. These connecting-rods are similar, although not shown in each place for the sake of clearness. They serve to reciprocate certain slides provided with carving-tools. All the slides are not shown in place for the sake of clearness; but it will be understood that, generally speaking, a vertical slide coöperates with a horizontal slide, the two being driven from two adjoining cranks—viz., the cranks 6 and 8 and the cranks 9 and 11. Although I have only shown two such sets of cranks, the machine may be made with more, its length being correspondingly increased. Two fly-wheels 17 are mounted on the driving-shaft.

On the frames 3 and 4 are provided bearings 18 and 19 for two shafts 20. On these shafts are fixed pulleys 26.

On the machine-framing are fixed sets of vertical brackets 22 and horizontal consoles 23—viz., a set at the right-hand end and a set at the left-hand end; but for the sake of clearness the horizontal bracket 23 is omitted at the left in Fig. 1, but shown at the right. The brackets 22 carry each a slide 24, working on dovetail guides, and the brackets 23 carry each a slide 25, working in dovetail guides. The slides each carry a tool-chuck 26, the tools being so set in a row that they (two or more of them) act progressively—that is to say, one making an initial cut to a certain depth and the next thereupon deepening the initial cut. Moreover, the tools in the chuck on one slide, generally the vertical one 24, make an incision by consecutive operations, as stated, and the tools in the chuck on the other slide, generally the horizontal one 25, scoop out by consecutive operations the material within the contour of the vertical cut. The cranks are preferably arranged, as shown, so that the tools in two slides, a horizontal and a vertical, are alternately brought in contact with a molding, but the tools converging toward the same place in the wood, so that when one set of tools has left the wood the other set enters it. The chips thus become detached. The brackets 22 and 23 are not fixed directly upon the machine-framing, but respectively upon angle-brackets 27 and 28, fixed on the latter, and slots and screws are provided on the angle-brackets for adjustment in the vertical, horizontal, and angular directions. Moreover, the angle-brackets themselves are adjustable, respectively, by means of screws 29 and 30.

Upon the vertical slide 24 at the left-hand end of the machine are provided links and levers carrying a pair of tools for making the curved cuts that are required for the rounded egg-shaped parts of the so-called "egg-and-tongue" pattern or the like. The two tools work in opposite directions, starting from the crown of an egg and cutting downward in a circular vertical plane parallel with the length of the molding. The distance between the tools is such as to allow each tool to operate on a different "egg," so that one-half is cut by the first tool in one direction, whereupon the molding is fed forward until the half-finished egg comes under the second tool, which then cuts the second half by a similar operation, but in the opposite direction. The cutting-tools are made to rise clear of the molding after each cut, so that the molding can be fed forward.

31 31 are two pendent bars pivoted at their upper end to the slide 24 and jointed at their lower end each to one end of a link 32, upon which is the tool-holder carrying the required cutting-tool 33$^\times$. The other end of this link 32 is jointed to a lever 33, which latter has its fulcrum-pin 34 on a piece 35, that is adjustably fixed on the framing of the machine. For this purpose the holes for the fixing-bolts 36 are so much larger that the pieces 35 can be shifted a little, both vertically and horizontally. When the slide 24 is in its highest position, as in Fig. 4, the pendent bar 31 with its link 32 and lever 33 are opened out, but as the slide descends with the pendent bar 31 the tool-carrying link 32 and the lever 33 are folded up hingewise, as shown in Fig. 6, and then, as shown in Fig. 1, while the lower prolongation 37 of the bar 31 slides against the fulcrum-bars of the lever 33 until the link 32 and lever 33 meet together, as in Fig. 1. In the position Fig. 6 the cutting edge of the tool on the link just comes in contact with the molding and commences to operate thereon. The end of the link 32, where the pendent bar 31 is jointed thereto, now overhangs the fulcrum-pin 34 of the lever, so that the further descent of the slide 24 with the pendent bar 31 compels the link and lever which abut against each other to turn together upon the fulcrum-pin 34 of the lever. Thus the cutting edge of the tool upon the link is made to describe an arc the radius of which is dependent upon the distance between the said cutting edge and the center of the fulcrum-pin 34. This arc forms one-half of the required egg-oval.

To insure that the link and lever fold up as required when the pendent bars 31 descend, the latter may have a spring—such, for instance, as the spring 38—which tends to keep the said bars 31 in a nearly-perpendicular position. Suitably-shaped guides may also be provided to prevent deviation from the proper course. When the cutting edges of the tools have reached the lowest point, as in Fig. 1, which is the base of the egg-oval, the slide 24 ascends, the bars 31, links 32, and levers 33 resuming their original unfolded position, Fig. 4.

The aforesaid crank-shaft 12, operated by tooth-wheels 13 and 14, operates a horizontal slide 25$^a$ just like the horizontal slide 25 and driven in a similar manner—that is to say, by a connecting-rod adjustable in length like the connecting-rods 15 16.

To the horizontal slide 25 at the left-hand end of the machine are connected links 50, which are each jointed to a double-armed lever 51, that carries a tool 52 for a curved cutting action. Each and all of the slides are adapted to receive any of the tool-holding or tool-operating devices described.

The feed which in the construction described in the aforesaid patent-specification was effected by upper smooth rollers and lower toothed rollers, the molding being between them, is in this invention, for the reason stated above, effected by a toothed endless steel band below the molding. This endless band 39 (shown in Fig. 1 and in the detail views Figs. 7 and 8) passes around the vertical pulley 26 at each end of the machine, the left-hand one of which is formed with teeth 40, while the pulley at the rear end is plain. The band 39 is, as shown, provided with holes 41, with which the pulley-teeth 40 engage. The band has holes punched into it, so as to form tongues, which are turned up to form teeth 43, the ends of which are filed off sharp, so as to readily enter the under side of hard-wood moldings or any other moldings. The moldings as they pass through the machine are thus positively held and carried forward by the teeth in the band, and the band is positively carried forward without slip by the teeth 40 on the forward pulley. At the same time the molding is held down against the toothed band by means of a presser-foot 44 and two springs 45, attached at their upper ends to the bracket 22. Clips 46, fixed on the slide 24, so act on the springs as to only depress the foot 44 during part of the descent of the slide, while at other times the work of the feed is unhindered, thus also preventing the band-teeth 43 from tearing in the wood lengthwise in case of soft wood. The bearing 19 of the front pulley-spindle may be made adjustable by any suitable means, so as to give the endless band 39 the required tension. The left-hand wheel 26 is formed with an internal tooth-rim, into which gears a tooth-pinion 46, which is fixed on the shaft 47, that carries the worm-wheel 48. This latter gears with an irregular worm 49 on the shaft 11. This worm has about two-thirds of its threads straight or running in a plane perpendicular to the axis of the shaft and the one-third of its thread pitched helically or obliquely thereon. Thus when rotating the right-angled part of the thread in passing between the teeth of the worm-wheel 48 holds the same stationary; but when the pitched part of the thread is passing between the said teeth the worm-wheel is caused to rotate, and the worm is so arranged on the driving-shaft that its pitched or operative part takes effect only when the tools are out of the wood.

The body 60 of the chuck is formed with a V-groove 61 along each side and is adjustably held in a longitudinal groove in the slide 24 (or 25) by means of the V-shaped clamps 62 and the set-screw 79, or the body 60 might be made of ordinary dovetailed shape and the clamp 62 of a shape to suit. The chuck-body 60 has upstanding side pieces 63, between which the four tools 64 64 and 65 65 (or a less or greater number of such) are located, resting, it may be, on packing-pieces 66 67 68 69 and with intermediate blocks, all as required. The tools at their back ends abut against set-screws 70 in the upstanding flange 71. The tools are held down by set-screws 72, tapped in the cross-bars 73, which latter are fixed to the side pieces 63 by means of screws 74. The tools are set forward severally by means of the set-screws 75. The whole chuck, with its tools, is set up to the work by the screw 76, which at one end is attached to the chuck and passes between lugs 77 on the slide 24 and is adjusted and fixed by nuts 78. The distinguishing feature of this chuck is that it can be bodily removed for sharpening the tools in a quick and convenient manner without disturbing the adjusted position of the tools—that is to say, by merely slackening one of the nuts 78 and screwing back two set-screws 79 on the same side. It is usually more advantageous to employ duplicate chucks with tools, so that when the tools in one chuck have lost their sharp cutting edges the entire chuck is removed and at once replaced by the duplicate one having tools already sharpened, so that no time is lost.

At the right-hand end of the machine where the molding to be carved is entered is fixed a bracket or standard 52, wherein is mounted an arm 53, which by a screw 54 can be raised and lowered. From this arm is hung a presser-roller 55 by means of rods 56, formed with shoulders which bear against helical springs 57, of which only one is shown. This roller presses somewhat elastically against the molding which passes underneath it, the under side of the molding being gripped by the teeth 43 of the feed-band 39. One or more adjustable fences or lateral guides 58 are provided for guiding the molding sidewise along the front, while a suitable fence is similarly provided along the back.

What I claim as my invention, and desire to secure by Letters Patent, is—

1. A machine for carving wood moldings or the like, consisting of a framing having a plurality of brackets angularly adjustable thereon in a more or less upright position, and a plurality of corresponding brackets angularly adjustable in a more or less horizontal position, said brackets being provided with guides, slides adapted to work along said guides, a tool-holding device adjustable on each slide, means for reciprocating said slides, an endless steel feed-belt provided with upwardly-projecting sharpened teeth for entering the under side of a molding, and elastic means for holding down the molding onto said belt, substantially as described.

2. The combination with a vertically-reciprocated slide of two pendent bars, a tool-carrying link jointed to the lower end of each, a lever jointed to the other end of said link and having its fulcrum on the machine-framing, the tool on each link serving to carve one-half of an egg-oval substantially as set forth.

3. In a machine for carving wood moldings or the like, a feeding device for the moldings, consisting of an endless steel belt provided with perforations and having outwardly-projecting sharpened teeth for entering the under side of a molding, two spindles provided with pulleys around which said belt is passed, one of said pulleys having its periphery provided with projections to enter the perforations of said belt for actuating the same, means for adjusting the tension of the belt, and elastic means for holding down the molding onto said belt, substantially as described.

4. In a machine for carving wood moldings and the like, the combination with a plurality of brackets angularly adjustable in a more or less upright position, and a plurality of corresponding brackets angularly adjustable in a more or less horizontal position, said upright brackets and said horizontal brackets being arranged in rows and provided with guides, slides adapted to work along said guides, and a tool-holding device adjustable on each slide, of a driving-shaft made in four parts and provided with adjustable cranks, means for adjusting said cranks angularly to each other, and connecting-rods provided with length adjustment and adapted for reciprocating the slides from said driving-shaft, substantially as described.

5. A machine for carving wood moldings or the like, consisting of a framing, a plurality of brackets angularly adjustable thereon in a more or less upright position, a plurality of corresponding brackets angularly adjustable thereon in a more or less horizontal position, each of said brackets being provided with guides, tool-carrying slides adapted to work along said guides, a driving-shaft provided with cranks, connecting-rods for reciprocating the tool-carrying slides from the cranks of said shaft, an endless steel feed-belt provided with perforations and having outwardly-projecting sharpened teeth for entering the under side of a molding, elastic means for holding down the molding onto said belt, pulleys around which the feed-belt is passed, one of said pulleys being provided with projections to enter the perforations of the feed-belt, and means for imparting intermittent progressive motion to said feed-belt, substantially as described.

In testimony whereof I have signed my name to this specification in the presence of two subscribing witnesses.

HENRY MARLES.

Witnesses:
WALTER JAMES SKERTEN,
V. JENSEN.